Dec. 20, 1960     H. FISCHER     2,964,963
TRANSMISSION AND CONTROL THEREFOR
Filed May 8, 1957     4 Sheets-Sheet 1
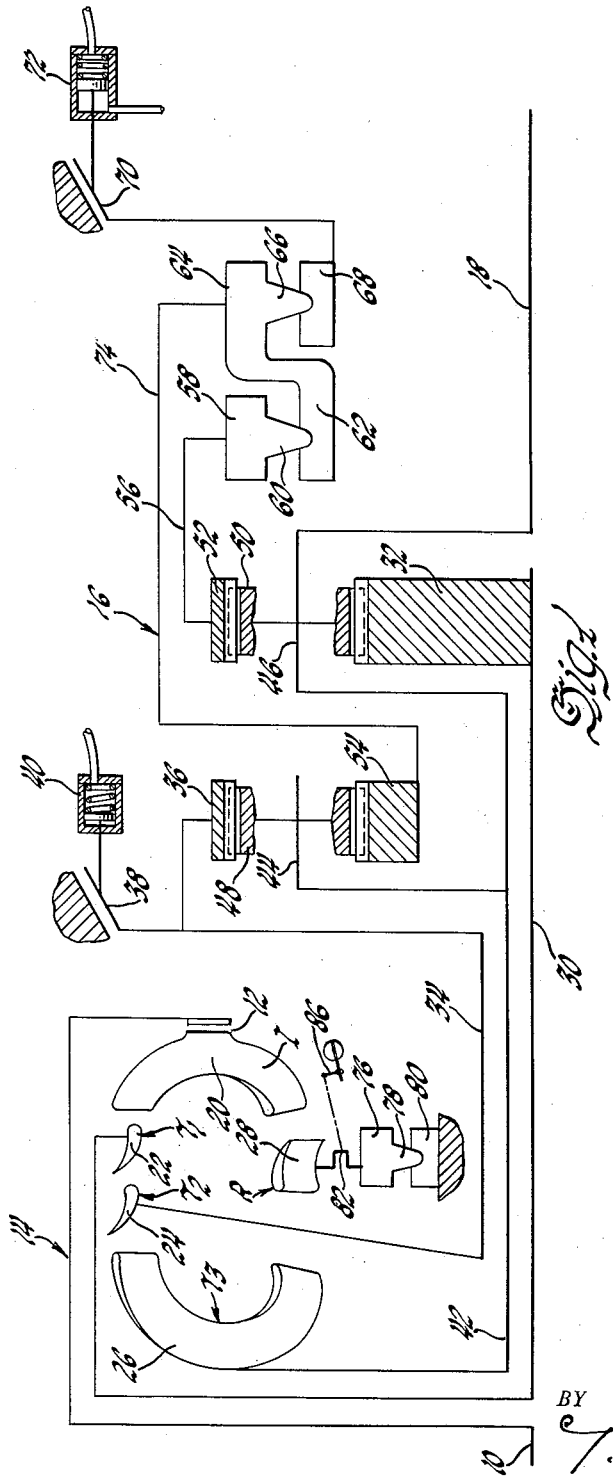
INVENTOR.
Harold Fischer
BY
T. L. Chisholm
ATTORNEY

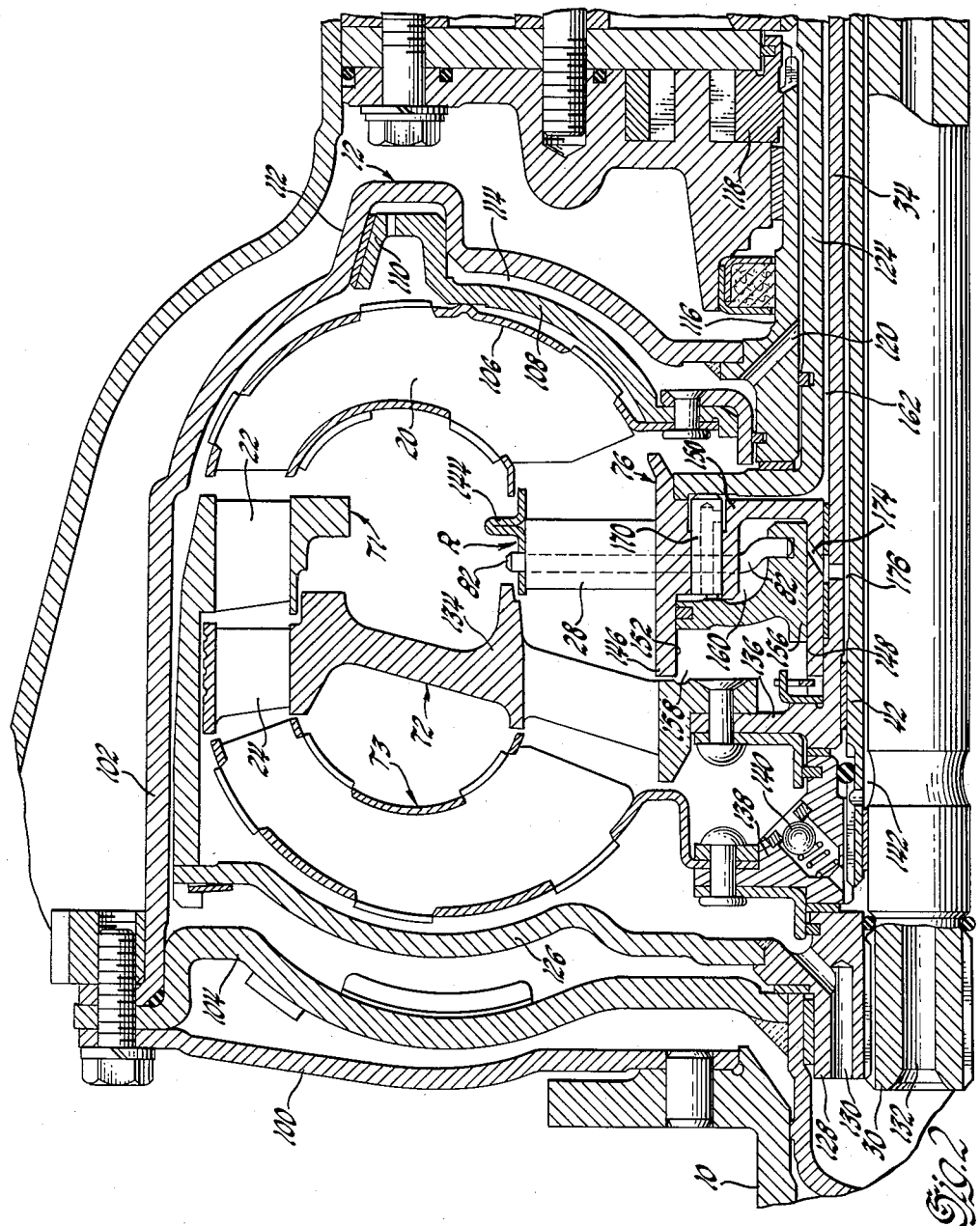

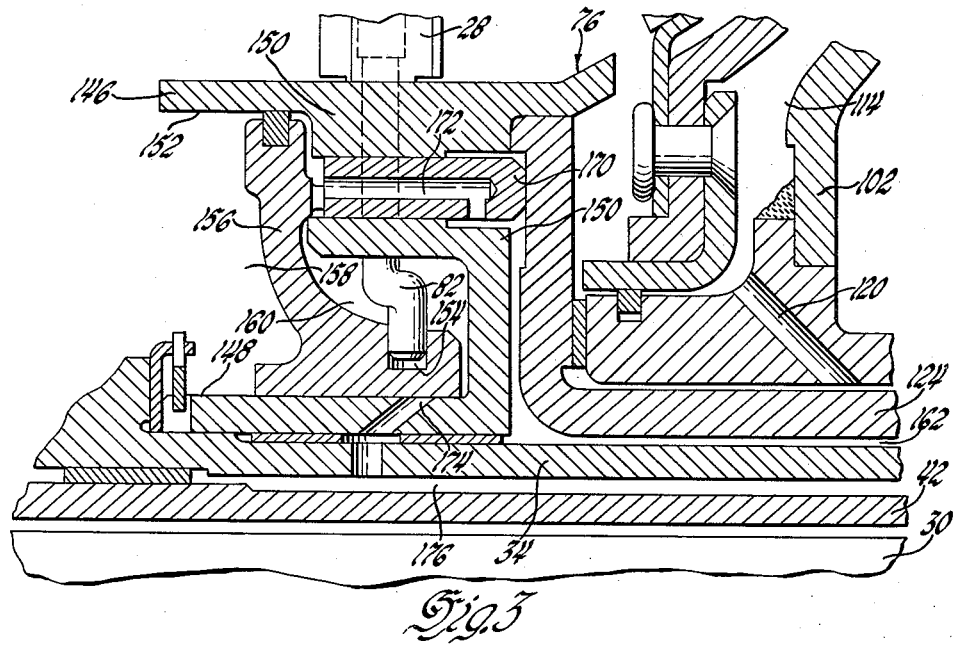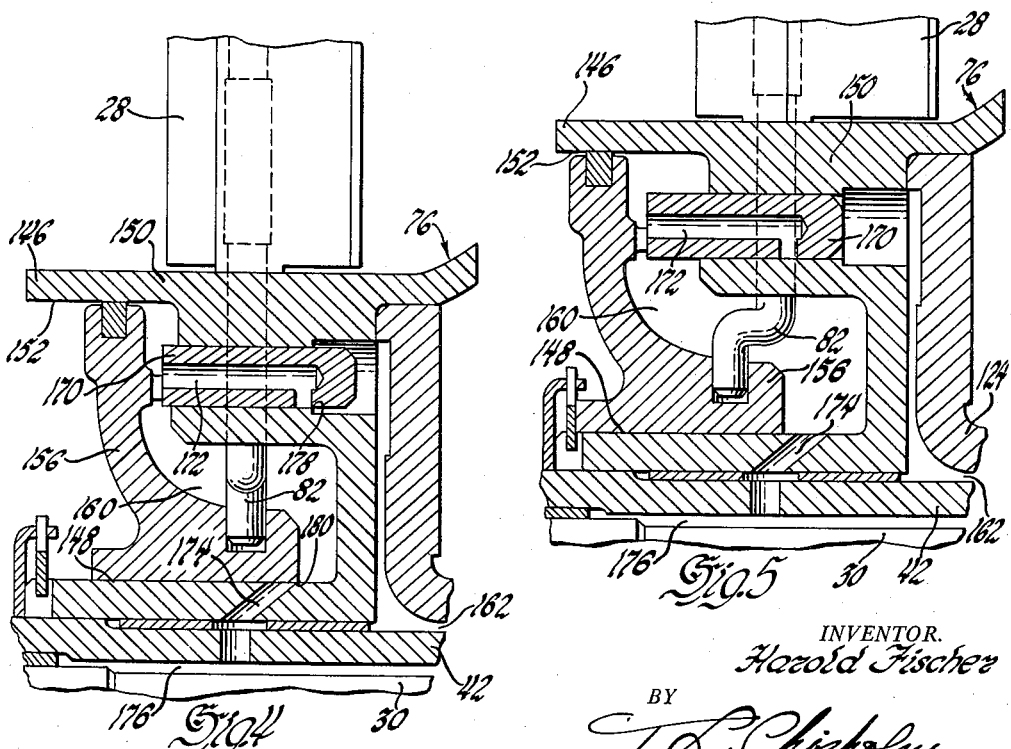

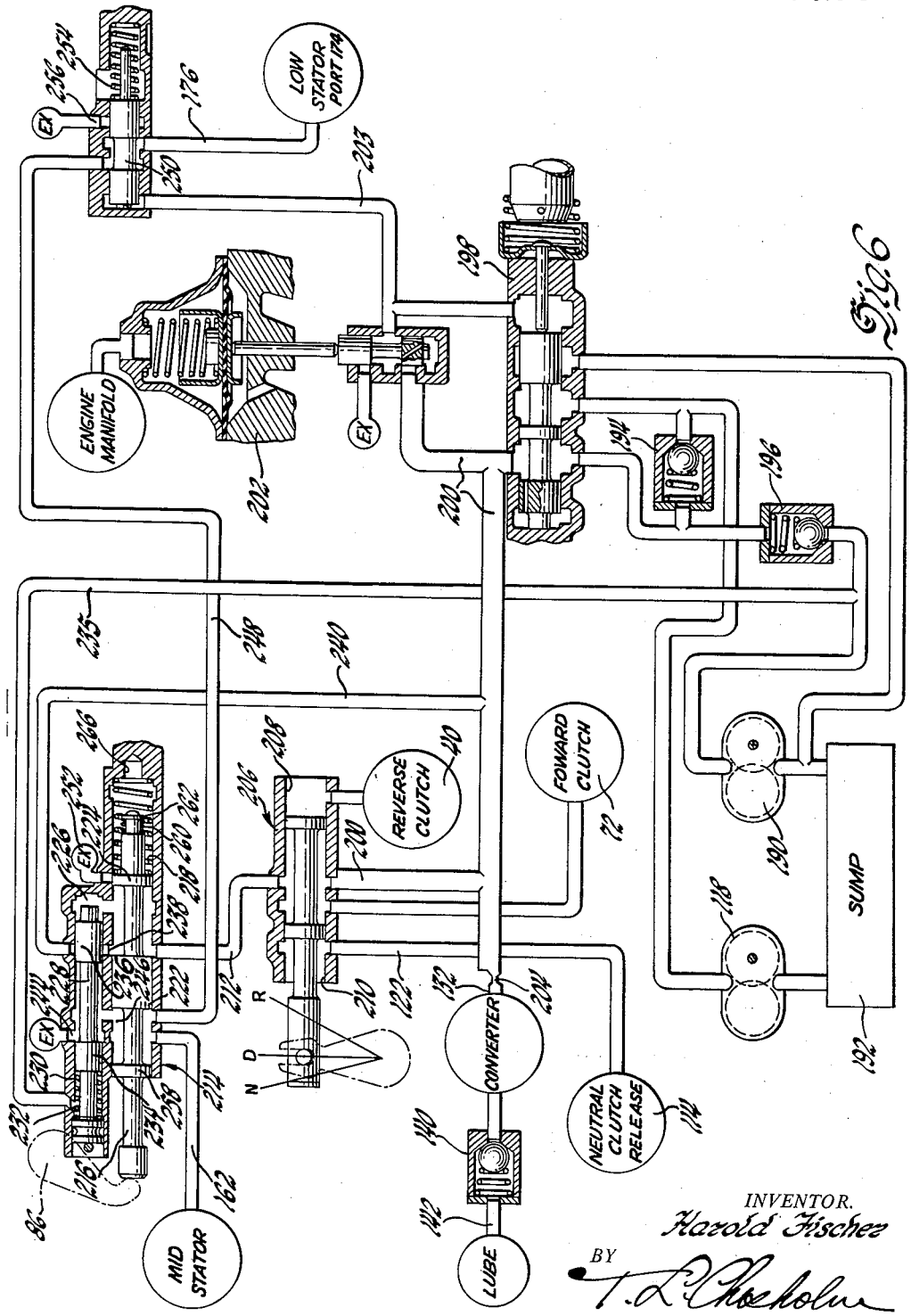

United States Patent Office 2,964,963
Patented Dec. 20, 1960

2,964,963
TRANSMISSION AND CONTROL THEREFOR

Harold Fischer, Flint, Mich., assignor to General Motors Corporation, Detroit, Mich., a corporation of Delaware Filed May 8, 1957, Ser. No. 657,928

11 Claims. (Cl. 74—472)

This invention relates to a transmission having a hydrodynamic torque converter provided with adjustable blades for controlling the torque transmitted. It is particularly but not exclusively suited to multiple turbine torque converters having adjustable reaction vanes as used in automobiles and the invention will be described for illustration only as embodied in such transmission.

These transmissions have high stall torque which means that with the turbines stationary as when the car is standing and with the engine running, the ratio of the torque exerted by the turbines to engine torque is very high. This is a desirable characteristic which promotes quick starting and gives good car performance but it sometimes has the disadvantage that the car tends to creep when we want it to stand, even when the engine is idling. This tendency to creep is particularly objectionable when the engine is idling fast as it is automatically set to do after starting cold.

It is one of the objects of the invention to prevent creep of the vehicle when the throttle is closed especially by restricting the flow of liquid in the torque converter and so reducing the torque. This may be done for example by moving the adjustable vanes of the reaction member into a position which prevents or restricts flow between the blades.

It is also an object to provide an improved and simple control which can readily be incorporated in existing transmission designs and which will effectively prevent creep.

In the drawings:

Figure 1 is a schematic representation of one-half of a symmetrical longitudinal section of a transmission embodying one form of the invention, Figure 2 is one-half of a symmetrical longitudinal section showing one form of actual structure of a torque converter included in the transmission, Figures 3, 4 and 5 are enlarged fragmentary sections taken like Figure 2 is taken showing various positions of the mechanism which controls the position of the reaction blades, and Figure 6 is a diagram of one form of hydraulic control system for the transmission.

*General arrangement of the transmission*

Referring to Figure 1, the transmission includes an input shaft 10 which may be the crank shaft of an internal combustion engine and which can be connected by a neutral clutch 12 to drive a hydrodynamic torque converter 14 which in turn drives planetary reduction and reverse gearing generally denoted by 16 connected to a final drive shaft 18 which may be the propeller shaft of an automobile. The torque converter includes an impeller I having blades 20 which, when the neutral clutch 12 is engaged, circulates working liquid through a first turbine $T_1$ having blades 22, a second turbine $T_2$ having blades 24, a third turbine $T_3$ having blades 26 and a reaction member R having blades 28.

The first turbine $T_1$ is connected by an output shaft 30 to a rear input sun gear 32 of the planetary gearing 16. The second turbine $T_2$ is connected by an output shaft 34 to a front input ring gear 36 which can also be held fast by a reverse device 38 which can be engaged by a hydraulic cylinder 40 to effect reverse drive as will be explained. The third turbine $T_3$ is connected by an output shaft 42 to the planet carriers 44 and 46 which respectively support front planet gears 48 meshing with the front input ring gear 36 and rear planet gears 50 which mesh with the rear input sun gear 32. The output shaft 42 is the principal drive shaft of the transmission and is connected through the carrier 46 to the final drive shaft 18. A reaction ring gear 52 meshing with planet gears 50 completes the rear planetary unit and a reaction sun gear 54 meshing with the front planet gears 48 completes the front planetary unit.

The rear reaction ring gear 52 is connected by a drum 56 to a one-way clutch or ratchet device having an outer member 58 which can rotate forward about the center line of shaft 18 but is prevented from rotating backward by a ratchet element 60 secured to the outer member 58 and overlapping an inner member 62 which can be fixed. This symbol schematically represents that the ratchet element 60 and the member 58 can move toward the eye of the observer out of the plane of the paper but cannot move away from the eye of the observer because they are blocked by the fixed member 62. The members 58 and 62 represent outer and inner races respectively, of any suitable over-running clutch or freewheeler.

The inner race 62 is integral with an outer race 64 of another similar one-way clutch, the race 64 being rotatable forward but prevented from rotating backward by ratchet element 66 secured to the outer race 64 and over lapping the member 68 representing an inner race which can be held fast by a forward torque-establishing device 70 which can be engaged by any suitable hydraulic cylinder 72. The races 62 and 64 are connected to the front reaction sun gear 54 by a drum 74.

Heretofore the various definitions of the terms clutch and brake have caused confusion. Some attempts to define the terms have been based on use or function regardless of structure while others have been based on type of structure or arrangement regardless of use or function. This has sometimes led to definitions of clutch and brake being mutually exclusive where they should not be and has led to overlapping definitions where mutual exclusion was intended. None of these definitions which have come to my attention have satisfactorily taken care of the situation in which an identical specimen is sometimes a brake and sometimes a clutch. Neither do they adequately describe a situation in which it is immaterial whether a member is a brake or a clutch, as described by reference to structure, where the significant consideration is the function of the device regardless of its structure.

To avoid this confusion and indefiniteness, the term torque-establishing device is used herein generically to mean any disengageable device which can be engaged to prevent rotation between two members which are otherwise relatively rotatable.

The stator is mounted on any suitable support 76 having any known overrunning brake represented by ratchet member 78 secured to the member 76 and overlapping the stationary support 80 to permit forward rotation of the stator but prevent backward rotation, as is known. In order to provide different ranges of torque multiplication for varying driving conditions and to restrict flow through the torque converter to prevent creep, I make the angles of the reaction blades adjustable by mounting each blade on a crank shaft 82 journaled in the support 76 which crankshafts can be positioned to hold the blades in the desired angle, preferably by any suitable connection to the arm 86 which operates the throttle of the engine.

*Operation of the general arrangement*

For forward drive the neutral torque-establishing device 12 and the forward torque establishing device 70 are engaged and the reverse torque-establishing device 38 is released. Torque impressed on the three turbines by liquid circulating in the torque converter drives forward sun gear 32, planet gears 50, ring gear 36, planet gears 48 and the carriers 44 and 46. Forward rotation of the sun gear 32 attempts to rotate the ring gear 52 backward which is prevented by the two one-way clutches 58—60—62 and 64—66—68 because the forward torque-establishing device 70 prevents rotation of the race 68. Consequently, the torque of $T_1$ assists the torque of $T_3$ in driving the carrier 46. Likewise forward rotation of the ring gear 36 attempts to drive backward the sun gear 54 which is prevented by the freewheeler 64—66—68 and the torque of $T_2$ therefore assists in driving the carrier 44. Thus the torque of each turbine is added to the output shaft 18 and the torques of $T_1$ and $T_2$ are multiplied by the mechanical advantages of the respective planetary gear sets. As the speed of the vehicle increases and the torque demand on the engine is consequently reduced, the turbines $T_1$ and $T_2$ become successively disconnected from the drive by forward rotation of the races 58 and 64 respectively, as is known.

For reverse drive the neutral torque-establishing device 12 and reverse torque-establishing device 38 are engaged and the forward torque-establishing device 70 is released. This holds ring gear 36 and turbine $T_2$ stationary during all reverse drive. Now $T_1$ drives the rear input sun gear 32 forward which, because the carrier 46 is initially held by the stationary car, drives the ring gear 52 backward which drives the races 62 and 64 and consequently the sun gear 54 backward. This is permitted for although the freewheeler 64—66—68 tends to lock, its inner race 68 can turn backward, being unopposed by the forward torque-establishing device 70. Consequently the front freewheeler 58—60—62 acts as a drive clutch for the forward sun gear 54 which, rotating backward, drives the carrier 44 backward, the ring gear 36 being held. This drives the car backward.

In the structure of Figure 1 the freewheelers 58—60—62 and 64—66—68 are both one-way clutches. Both freewheelers always function to prevent motion in one direction or sense of rotation when the forward torque-establishing device 70 is set, because then neither the race 68 nor the race 58 can rotate backward. However, when the forward torque-establishing device 70 is released and the reverse torque-establishing device 38 is set, because the ring gear 52 drives the sun gear 54 backward through the freewheeler 58—60—62, this freewheeler functions as a one-way drive clutch.

In Figure 2 the engine shaft 10 is secured to a flywheel 100 bolted to a torque converter casing including an outer shell 102 and a front cover 104. The impeller blades 20 are secured to the impeller shell 106 which at its center is riveted to a quarter toroidal shell 108, the outer edge of which is formed into the driven torque-establishing device member 110 which mates with a corresponding conical driving surface 112 of the neutral torque-establishing device 12 formed in the shell 102. The space 114 between the torque converter shell 102 and the torque-establishing device shell 108 constitutes a pressure chamber for disengaging the torque-establishing device 12, against the engaging pressure of working liquid within the torque converter, whenever the chamber is pressurized.

The converter shell 102 may be welded to a tubular drive shaft 116 which drives any suitable oil pump 118 herein called the front pump. The front part of the front pump drive shaft 116 has a passage 120 leading from the torque-establishing device release chamber 114 to the neutral torque-establishing device release passage 122 formed as the space between the tube 116 and an inner tubular shaft 124 which is part of the stator support 76 of Figure 1.

The first turbine $T_1$ is secured to a flange 126 having a hub 128 splined to the shaft 30 which drives the rear input sun gear 32. The hub 128 has openings 130 for supplying the working liquid, preferably oil, to the torque converter from a passage 132 in the hollow shaft 30 to which the control system described below supplies oil under pressure.

The second turbine $T_2$ is supported on a spider 134 riveted to a flange 136 integral with shaft 34 which drives the front input ring gear 36.

The third turbine $T_3$ is riveted to a hub 138 splined to the front end of shaft 42 which drives the carriers 44 and 46. A pressure relief valve 140 in hub 138 controls the flow of oil from the torque converter working space to the outflow passage 142 between shafts 42 and 30. This valve 140 together with pump 118 maintains substantially constant static pressure in the converter, as is known, for example, 30 pounds per square inch.

As shown in Figure 2, the reaction member, guide wheel or stator R includes a blade support generally designated by 76 (which forms one of the two surfaces which direct oil through the stator) and a shroud 144 forming the other surface between which the blades 28 are mounted on the spindles or crankshafts 82 journaled in the support 76. Support 76 is secured to the tube 124 which is connected to any suitable freewheeler (not shown structurally) represented by the ratchet member 78 in Figure 1 so that the entire stator is rotatable about the transmission axis but only forward as is known. The support 76 includes an outer cylindrical wall 146 joined to an inner cylindrical wall 148 by a thick annular wall 150 to form an open ended annular cylinder 152. The inner wall 148 is supported for rotation by any suitable bearings on the shaft 34.

Each crankshaft 82 has an offset crank disposed in an annular groove 154 in an annular piston 156 which slides in the annular cylinder 152 and divides the cylinder into two pressure chambers 158 and 160 for positioning the piston and the stator blades. The high angle holding chamber 158, together with piston 156 constitutes means constantly urging the blades toward high angle. The chamber 158 is constantly open to the torque converter so that converter pressure always urges the piston toward the right, as Figure 2 is seen, which is toward the position of highest blade angle. In this angle the blades make the greatest change of direction of oil flowing from the turbine $T_3$ to the impeller I and thus provide the greatest range of torque multiplication. Pressure in the low angle holding chamber 160 can oppose and overcome the pressure in the chamber 158 and move the piston all the way to the left which is the position of lowest angle and lowest torque multiplication. The blades 28 may have a larger area on the downstream or right-hand sides of the shafts 82 than on the upstream side. If so, the hydraulic force of oil circulating in the torque converter constantly urges the blades to low angle, that is urges the piston toward the left, assisting pressure in the low-angle chamber 160. The apparatus is so proportioned that when there is no pressure in the low angle chamber 160, pressure maintained by the torque converter in the high angle chamber 158 is sufficient to overcome any hydraulic force on the blades 28 and move them to their position of highest angle. This can occur throughout the entire operating range of the torque converter.

Whenever the low angle chamber 160 is vented, the converter pressure in high angle chamber 158 moves the piston all the way to the right into the highest angle position shown in Figure 3. Whenever the low angle chamber 160 is filled with oil under sufficient pressure, the piston is moved all the way to the left holding the blades in the position of lowest angle shown in Figure 5. At some value of pressure in the low angle chamber 160 less than the pressure necessary to hold the blades at low angle, the force on the piston 156 of the pressure in chamber 160 plus any hydraulic force on the blades 28 equals the force on the piston of pressure in the high angle chamber 158 and this holds the blades balanced. This balance can be achieved when the blades are in an intermediate position shown in Figure 4 as will be explained.

Oil under pressure can be supplied to the low angle chamber 160 from a mid-angle holding passage 162 between shafts 34 and 124 under the control of a pressure regulating and position responsive valve 170 which is slidable in the wall 150 and has a restricted or slow-flow passage 172 from the passage 162 into the chamber 160. Oil can also be supplied to the low-angle holding chamber 160 through a mid position port 174 in the inner wall 148 and communicating with a low-angle holding passage 176 between shafts 34 and 42. Whenever oil is supplied through both passages 162 and 176 at sufficient pressure, the piston is held in the position of Figure 5 and positions the blades at their lowest angle.

When oil is supplied to the low-angle chamber 160 through the mid-angle holding passage 162 alone and low-angle holding passage 176 is vented the piston is held in the mid position as shown in Figure 4, holding the blades at medium angle. This is accomplished as follows. When oil is first supplied to the mid-angle holding passage 162, at a pressure equal to or higher than converter pressure, the piston 156 begins to move to the left, and the valve or plug 170 follows the piston because the pressure on the right-hand of the valve is greater than the pressure on its left-hand. This pressure is higher because the pressure on its left-hand is that of oil flowing through the restricted passage 172 into the space 160 which is expanding. When the piston reaches mid position, as shown in Figure 4, the corner or edge 178 of the position responsive plug 170 just closes communication between passages 172 and 162, and stops further flow of oil into the chamber 160. Also at this point the edge 180 of the piston just closes port 174 which is now vented. This arrangement acts as a position responsive regulator valve which begins to function when the piston reaches its mid position and thereafter maintains in the low-angle holding chamber 160 a pressure just balancing the forces tending to move the blades toward high angle. Thus if the pressure of the torque converter rises or the pressure in low-angle chamber 160 falls, the piston tends to move to the right but this moves the valve 170 to open slightly communication between passages 172 and 162 to admit more liquid from passage 162 which moves the piston to the left again until the passage 162 is closed by the corner 178. On the other hand, if the torque converter pressure falls and the piston moves too far to the left, the corner 180 of the piston opens slightly the vented port 174 so that liquid is drained from the cylinder 160 into the vented passage 176 allowing the converter pressure to move the piston back to the right. As soon as port 174 is closed again by the corner 180 of the piston, further drainage is prevented and the piston is held in mid position. The piston may tend to hover or move between two positions slightly on either side of absolute mid position which does not significantly move the blades 28 but holds them in mid position.

In order to place the blades in low angle it is necessary to supply oil to the low-angle holding chamber 160 through both the passages 162 and 176. When this is done the piston moves to the left until it reaches mid position as described above, and the valve 170 closes the mid-angle holding passage 162 and the piston tends to open port 174. Pressure of oil in the low-angle holding conduit 176 then is communicated to the chamber 160 and moves the piston all the way to the left into the position as shown in Figure 5, which is the position of lowest angle.

To go from low angle to intermediate angle the low-angle holding passage 176 is vented while the mid-angle holding passage 162 is supplied. This lets the converter pressure move the piston from the position of Figure 5 to the position of Figure 4. To move the blades to high angle both passages 176 and 162 are vented and this allows the converter pressure to move the piston to the position of Figure 3, which is the position of highest angle.

While the position of highest angle effects the greatest torque multiplication when there is any substantial flow through the torque converter, the placing of the blades in high angle tends to restrict or close passage through the stator in the manner of a Venetian blind. This restricting effect is more than overcome and high torque multiplication is effected whenever the impeller is rotated fast enough to provide substantial flow. However, when the impeller is rotated slowly, as happens when the engine is idling, the restriction effected by the stator blades in high angle is sufficient to prevent any substantial torque being impressed on the turbines and this prevents creep of the car.

The control system described below places the stator blades in high, intermediate, or low angle in accordance with the torque or power demand on the engine and it also automatically places the blades in low angle or restricting position whenever the throttle is closed and the car is standing or is not moving forward above a predetermined low speed. Thus the stator blades constitute flow restricting means which are moved into restricting position whenever it is desired to prevent creep.

*Control system*

The structure described above can be operated by any suitable controls which select the desired direction of drive and which place the stator blades in the desired positions either manually or automatically or both. One example of controls embodying the invention is shown in Figure 6 in which the front pump 118 driven by the engine and a rear pump 190 driven by the output shaft 18 take in oil from a common sump 192 and deliver it at high pressure through check valves 194 and 196 respectively, through a pressure regulator valve 198 to a main line 200. The pressure regulator valve 198 may be of any suitable known construction which tends to maintain in the line 200 a substantially constant pressure from either of the pumps 118 and 190 or both of them, for example, 90 pounds per square inch, which pressure however may be modulated in accordance with the torque demand on the engine by any suitable known vacuum modulating valve 202 influenced by the pressure in the induction manifold of the engine. The vacuum modulating valve receives oil from the main line 200 and maintains in the conduit 203 a pressure which is a measure of the pressure in the manifold of the engine and hence is a measure of torque or power demand on the engine. This is called torque demand index pressure. Whenever the torque demand on the engine is low, for example, when the throttle is closed to idling position or slightly open and the load on the engine is low, the absolute pressure in the manifold is low (vacuum is high) and this reduces the index pressure in the line 203. Whenever the torque demand is high, for example, when the throttle is open to deliver more torque or power, the absolute pressure in the manifold is high (vacuum is low) and this increases the index pressure in the line 203.

The front pump can by itself provide the maximum line pressure when the engine is idling. The rear pump can provide the maximum line pressure after the car attains some predetermined forward speed, such as 30 miles per hour. At car speeds below this the pressure of the rear pump is a function of car speed. The check valves 194 and 196 and the relative pressures of the two pumps determine whether both pumps, or which one alone is supplying oil to the main line.

Oil is supplied from the main line 200 to the previously mentioned converter supply conduit 132 through any suitable restriction 204 and oil flows from the converter to the lubrication system represented by the legend lube through the pressure responsive relief valve 140. This maintains a substantially constant static pressure in the converter, for example, 30 pounds per square inch, and this is the pressure which is always active in the cylinder 158 to urge the blades toward the position of highest angle.

A manual selector valve 206 of any suitable form may direct oil from main line 200 to the various pressure chambers for operating the neutral, forward and reverse torque-establishing devices, as labeled in the diagram Figure 6. When the manual valve is in the D for drive position shown in Figure 6, it directs oil into the forward torque-establishing device chamber 72. The reverse torque establishing device chamber 40 is vented through the open end 208 of the valve 206 and the neutral torque-establishing device release chamber 114 is vented through the open end 210 of the valve. If the manual valve is moved to the right, namely to the R for reverse position, it blocks the vent port 208 and directs oil into the reverse torque-establishing device chamber 40 to establish reverse drive. The forward torque-establishing device chamber 72 is vented through the port 210 and the neutral torque-establishing device release chamber 114 remains vented as before. If the manual valve is moved to the left, namely to the N for neutral position, it blocks the vent port 210 and directs oil from the main line into the neutral torque-establishing device release chamber 114 and vents the reverse torque-establishing device through port 208. The forward torque-establishing device chamber 72 remains filled and holds the forward torque-establishing device applied but no drive can occur because the neutral torque-establishing device is released.

The main line 200, regardless of the position of the manual valve, always supplies oil to a conduit 212 connected to a stator control valve generally designated by 214. This includes a stem 216 which can be moved to the right against a return spring 218 by the previously mentioned arm 86 connected to the throttle of the engine so that the position of the valve stem 216 is an indication of the amount of throttle opening and therefore of torque or power demand.

Whenever the throttle is closed or in idling position as shown in Figure 6, a land 222 on stem 216 uncovers the conduit 212 to supply oil to a pressure chamber 226 at the right end of a high angle control valve 228. This pressure urges the valve 228 to the left against the force of a return spring 230 and against the force, if any, of oil under pressure in the chamber 232 at the left of the land 234 on valve 228, which chamber is connected to the outlet of the rear pump by the conduit 235. The arrangement is such that when the car is standing or is running forward below a predetermined low speed which may, for example, be 5 miles per hour, the force of main line pressure in the chamber 226 overcomes the spring 230 and any rear pump pressure in chamber 232 and moves the valve stem 228 fully to the left to the position in which it is shown in Figure 6. In this position the land 236 on the valve stem 228 closes a port 238 connected to the main line by conduit 240 and opens a vent port 244. This vents the chamber 246 at the left of land 222 and consequently vents previously mentioned mid-angle holding conduit 162 and low-angle holding conduit 176 connected to this chamber, the conduit 176 being connected to the chamber by conduit 248 and a torque-demand-responsive control valve 250, which at this time is open, as will be described. This vents the stator low-angle holding chamber 160 and permits the torque converter pressure to move the piston 156 to the position shown in Figure 3 and hold the stator blades 28 at highest angle. If the throttle is closed but if the car is moving forward above the predetermined speed of 5 miles per hour, the rear pump supplies sufficient pressure to the chamber 232 which, added to the force of the spring 230, overcomes the force of main line pressure in the chamber 226 and moves the valve stem 228 all the way to the right closing exhaust port 244 and opening port 238 to admit main line pressure to chamber 246 and to conduits 162 and 248. This supplies the low angle holding chamber 160 with oil both through conduit 162 and the position responsive valve 170 to move the stator to mid position, and through mid port 174 and conduit 176 to move the blades to low angle. Therefore, whenever the car is moving forward above a predetermined speed with the throttle closed, the stator cannot be in high angle.

On the other hand, if the throttle is open even slightly, the land 222 closes the conduit 212 and land 224 opens exhaust port 252 to vent the pressure chamber 226. Even if there is no rear pump pressure in chamber 232, this permits the spring 230 to move the valve stem 228 fully to the right in which position it closes exhaust port 244 and pressurizes conduits 162 and 248, which prevents the stator blades from being held in high angle.

Thus on low throttle starts and for operation under conditions of low torque demand, the conduits 162 and 248 are both supplied with oil under pressure and the stator blades are held in the position of lowest angle as shown in Figure 5. Whenever torque demand increases to a predetermined value, which occurs when the throttle is opened a predetermined amount, the torque demand index pressure in line 203 closes the torque demand valve 250 by moving it to the right against the force of the return spring 254 interrupting communication between conduits 248 and 176 and connecting conduit 176 to vent port 256. This prevents the low-angle holding chamber 160 from being supplied with pressure at port 174 and vents this port so that the low-angle holding cylinder 160 is supplied from mid-angle holding line 162 through control valve 170 which maintains the valve in the mid position, as shown in Figure 4 and as described above. Thus during normal driving operations from slightly open throttle to fully open throttle, the stator blades are either in low angle position or mid position depending on the torque demand on the engine as indicated by the position of the valve 250.

For very high torque demand the throttle is floored. Then the control system moves the stator blades to high angle position in response to movement of the throttle operating arm 86 past wide open throttle position. When this occurs the land 258 on valve stem 216 interrupts communication between the chamber 246 and the mid-angle holding line 162 and vents this line through the open left-hand end of the valve 214. This vents the low-angle holding chamber 160 through conduit 162 and places the stator in highest angle as shown in Figure 3 and as explained above. Low-angle holding line 176 has already been vented by the valve 250 due to high torque demand index pressure.

In order that the stator may not be placed in high angle inadvertently, the valve stem 216 may be provided with a preloaded spring 260 held by a stop 262. The stop 262 strikes the end of the bore 266 when the throttle is fully opened but land 258 still prevents venting of conduit 162. This requires additional force necessary to compress the spring 260 in order to move the valve stem so that the land 258 will vent the line 162. This arrangement warns the operator and requires additional deliberate pressure on the throttle to place the blades in high angle.

To summarize the operation: when the throttle is closed the stator blades are at high angle only if the car is standing or moving less than about 5 m.p.h.; when the throttle is open slightly the blades are at low angle whether the car is moving or not; when the car is moving about 5 m.p.h. the blades are at low angle no matter whether the throttle is closed or is open slightly; when the throttle is open any amount from just open to full throttle the blades are either in mid position or at high angle depending on the amount of throttle opening and this is not influenced by car movement or speed; the blades are placed in high angle only by moving the throttle mechanism past full throttle position.

I claim:

1. A transmission adapted to be driven by a throttle-controlled engine and adapted to drive a vehicle, comprising in combination, a hydrodynamic torque converter including a bladed member having angularly adjustable blades, means adapted to hold the blades in one angular position permitting relatively large flow in the working circuit of the converter, and means responsive jointly to closing of the throttle and to stopping of the vehicle for holding the blades in another position permitting only relatively small flow.

2. A transmission adapted to be driven by a throttle-controlled engine and adapted to drive a vehicle, comprising in combination, a hydrodynamic torque converter including a bladed member having angularly adjustable blades, means adapted to hold the blades in one angular position permitting relatively large flow in the working circuit of the converter, and means responsive jointly to closing of the throttle and to forward speed of the vehicle less than a predetermined value for holding the blades in another position permitting only relatively small flow.

3. A transmission adapted to be driven by a throttle-controlled engine and adapted to drive a vehicle, comprising in combination, a hydrodynamic torque converter including an impeller, a turbine, and a reaction member having angularly adjustable blades, means adapted to hold the blades in one angular position permitting relatively large flow in the working circuit of the converter, and means responsive jointly to closing of the throttle and to stopping of the vehicle for holding the blades in another position permitting only relatively small flow.

4. A transmission adapted to be driven by a throttle-controlled engine and adapted to drive a vehicle, comprising in combination, a hydrodynamic torque transmitter having bladed members adapted to circulate liquid for the transmission of torque, means for restricting the flow of liquid in the circuit, means normally holding the restricting means in a position to permit unrestricted flow in the circuit, and means responsive jointly to closing of the throttle and to forward speed of the vehicle less than a predetermined value for holding the restricting means in position to restrict the flow of liquid.

5. A transmission adapted to be driven by a throttle-controlled engine and adapted to drive a vehicle comprising in combination, a hydrodynamic torque transmitter having bladed members adapted to circulate liquid for the transmission of torque, means for restricting the flow of liquid in the circuit, means urging the restricting means toward a position restricting flow in the circuit, means normally overcoming the urging means and holding the restricting means in a position to restrict flow and means responsive jointly to closing of the throttle and to forward speed of the vehicle less than a predetermined value for preventing operation of the normally overcoming means.

6. A transmission adapted to be driven by a throttle-controlled engine and adapted to drive a vehicle, comprising in combination, a hydrodynamic torque converter including a reaction member having angularly adjustable blades adapted to vary the torque delivered by the converter, means for adjusting the blades during normal operation of the converter to vary its torque output, and means responsive jointly to closing of the throttle and to stopping of the vehicle for holding the blades in position to restrict the flow of liquid through the reaction member.

7. A transmission adapted to be driven by a throttle-controlled engine and adapted to drive a vehicle comprising in combination a hydrodynamic torque converter which circulates liquid in a closed circuit for the transmission of torque, means in the torque converter adapted to restrict flow in the circuit to limit the torque transmitted, means urging the restricting means to restricting position, a pressure chamber for opposing the urging means, a source of pressure, means normally connecting the source to the chamber to hold the restricting means in non-restricting position, and means jointly responsive to closing of the throttle and to a forward speed of the vehicle less than a predetermined value for venting the chamber to place the restricting means in flow restricting position.

8. A transmission adapted to be driven by a throttle-controlled engine and adapted to drive a vehicle comprising in combination a hydrodynamic torque converter which circulates liquid in a closed circuit for the transmission of torque, means in the torque converter adapted to restrict flow in the circuit to limit the torque transmitted, means urging the restricting means to restricting position, a pressure chamber for opposing the urging means, a source of pressure, a valve adapted selectively to connect the source to the chamber or to interrupt the connection and vent the chamber, means urging the valve to connecting position, and means responsive to closing of the throttle for overcoming the last-named urging means and moving the valve to venting position.

9. A transmission adapted to be driven by a throttle-controlled engine and adapted to drive a vehicle comprising in combination a hydrodynamic torque converter which circulates liquid in a closed circuit for the transmission of torque, means in the torque converter adapted to restrict flow in the circuit to limit the torque transmitted, means urging the restricting means to restricting position, a pressure chamber for opposing the urging means, a source of pressure, a valve adapted selectively to connect the source to the chamber or to interrupt the connection and vent the chamber, means urging the valve to connecting position, means responsive to closing of the throttle for overcoming the last-named urging means and moving the valve to venting position and means responsive to forward motion of the vehicle for assisting the last-named urging means.

10. A transmission adapted to be driven by a throttle-controlled engine and adapted to drive a vehicle comprising in combination a hydrodynamic torque converter which circulates liquid in a closed circuit for the transmission of torque, means in the torque converter adapted to restrict flow in the circuit to limit the torque transmitted, means urging the restricting means to restricting position, a pressure chamber for opposing the urging means, a source of pressure, a valve adapted selectively to connect the source to the chamber or to interrupt the connection and vent the chamber, a spring urging the valve to connecting position, a pressure chamber for opposing the spring, means responsive to closing of the throttle for supplying the last-named chamber with fluid under pressure and moving the valve to venting position, a pressure chamber for assisting the spring and means responsive to forward motion of the vehicle for supplying fluid under pressure to the last-named chamber.

11. A transmission adapted to be driven by a throttle-controlled engine and adapted to drive a vehicle comprising in combination a hydrodynamic torque converter which circulates liquid in a closed circuit for the transmission of torque, means in the torque converter adapted to restrict flow in the circuit to limit the torque transmitted, means urging the restricting means to restricting position, a pressure chamber for opposing the urging means, a source of pressure, a valve adapted selectively to connect the source to the chamber or to interrupt the connection and vent the chamber, means urging the valve to connecting position, means responsive to closing of the throttle for urging the valve toward venting position, and means responsive to forward motion of the vehicle above a predetermined minimum speed for holding the valve in connecting position.

References Cited in the file of this patent

UNITED STATES PATENTS

| | | |
|---|---|---|
| 2,327,647 | Jandasek | Aug. 24, 1943 |
| 2,354,596 | Jandasek | July 25, 1944 |